US012400601B2

(12) United States Patent
Jeong

(10) Patent No.: US 12,400,601 B2
(45) Date of Patent: Aug. 26, 2025

(54) GATE IN PANEL DRIVING CIRCUIT AND DISPLAY APPARATUS HAVING THEREOF

(71) Applicant: LG DISPLAY CO., LTD., Seoul (KR)

(72) Inventor: Duk-Young Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/389,106

(22) Filed: Nov. 13, 2023

(65) Prior Publication Data

US 2024/0221678 A1 Jul. 4, 2024

(30) Foreign Application Priority Data

Dec. 28, 2022 (KR) ........................ 10-2022-0187718

(51) Int. Cl.
*G09G 3/3266* (2016.01)
*G09G 3/32* (2016.01)
*G09G 3/36* (2006.01)

(52) U.S. Cl.
CPC ............. *G09G 3/3266* (2013.01); *G09G 3/32* (2013.01); *G09G 3/3677* (2013.01); *G09G 2310/0267* (2013.01); *G09G 2310/08* (2013.01)

(58) Field of Classification Search
CPC ...... G09G 3/3266; G09G 3/32; G09G 3/3677; G09G 3/20; G09G 2310/0267; G09G 2310/08; G09G 2300/0408; G09G 2300/0426; G09G 2320/043; H01L 29/78672; H01L 29/7869; H10K 59/1213; H10K 59/124; H10K 59/131
See application file for complete search history.

(56) References Cited

U.S. PATENT DOCUMENTS

| | | | | |
|---|---|---|---|---|
| 2015/0243220 | A1 | 8/2015 | Kim et al. | |
| 2018/0233575 | A1 | 8/2018 | Kim et al. | |
| 2021/0065631 | A1* | 3/2021 | Kim | G11C 19/28 |
| 2022/0223109 | A1* | 7/2022 | Lai | G11C 19/287 |

FOREIGN PATENT DOCUMENTS

| | | | |
|---|---|---|---|
| EP | 3113226 | A1 | 1/2017 |
| KR | 10-2015-0100459 | A | 9/2015 |
| KR | 10-2015-0100516 | A | 9/2015 |
| KR | 10-2018-0094185 | A | 8/2018 |

OTHER PUBLICATIONS

Office Action issued in corresponding Korean Intellectual Property Application No. 10-2022-0187718, dated Jul. 10, 2025.

* cited by examiner

*Primary Examiner* — Christopher E Leiby
(74) *Attorney, Agent, or Firm* — Morgan, Lewis & Bockius LLP

(57) ABSTRACT

A GIP circuit according to the present invention includes a substrate, a first semiconductor layer on the substrate, a gate electrode over the first semiconductor layer, a second semiconductor layer over the gate electrode, a gate control electrode over the second semiconductor layer, a gate control signal being applied to the gate control electrode, an insulating layer over the gate control electrode, and a first drain electrode, a second drain electrode, a first source electrode, and a second source electrode over the insulating layer.

10 Claims, 6 Drawing Sheets

GATE IN PANEL DRIVING CIRCUIT AND DISPLAY APPARATUS HAVING THEREOF

CROSS-REFERENCE TO RELATED APPLICATION

This application claims priority to and the benefit of Republic of Korea Patent Application No. 10-2022-0187718, filed on Dec. 28, 2022, the contents of which are incorporated herein by reference in its entirety.

BACKGROUND

1. Technical Field

The present invention relates to a GIP circuit capable of driving two transistors with one gate electrode and adjusting a threshold voltage, and a display apparatus including the same.

2. Discussion of the Related Art

Recently, as a display apparatus have become thinner, a Gate In Panel (GIP) driving unit in which a gate driving unit is embedded in a display panel has been proposed. The GIP driving unit includes an inverter unit which is a latch circuit and maintains the original value unless input is applied from the outside.

Meanwhile, recently, a structure in which an inverter unit is formed of a pMOS transistor having a polycrystalline semiconductor and an nMOS transistor having an oxide semiconductor has been proposed. However, since the inverter unit of this structure is formed of two transistors, there is a problem in that the area is increased by the two transistors and the threshold voltage is shifted due to deterioration of the nMOS transistor having the oxide semiconductor.

SUMMARY

Accordingly, embodiments of the present disclosure are directed to a gate in panel driving circuit and a display apparatus having the same that substantially obviate one or more of the problems due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a GIP circuit according to the present invention includes a substrate, a first semiconductor layer on the substrate, a gate electrode over the first semiconductor layer, a second semiconductor layer over the gate electrode, a gate control electrode over the second semiconductor layer, a gate control signal being applied to the gate control electrode, an insulating layer over the gate control electrode, and a first drain electrode, a second drain electrode, a first source electrode, and a second source electrode over the insulating layer.

The first semiconductor layer is formed of a polycrystalline semiconductor and the second semiconductor layer is formed of an oxide semiconductor.

The first semiconductor layer and the second semiconductor layer are respectively activated as a negative (−) input voltage and a positive (+) input voltage are applied to the gate electrode.

The first drain electrode is contacted with a drain region of the first semiconductor layer and the first source electrode is contacted with a source region of the first semiconductor layer.

The first source electrode is contacted with a source region of the first semiconductor layer and the second source electrode is contacted with a source region of the second semiconductor layer.

The first source electrode and the second source electrode are electrically connected over the insulating layer.

A gate control line is disposed over the insulating layer to supply the gate control signal to the gate control electrode, and the gate control signal is a voltage of opposite sign to a bias voltage applied to the second semiconductor layer.

A display apparatus according to the present invention comprise a display panel, a driving unit outside the display panel, and a GIP circuit in the driving unit.

It is to be understood that both the foregoing general description and the following detailed description are exemplary and explanatory and are intended to provide further explanation of the inventive concepts as claimed

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
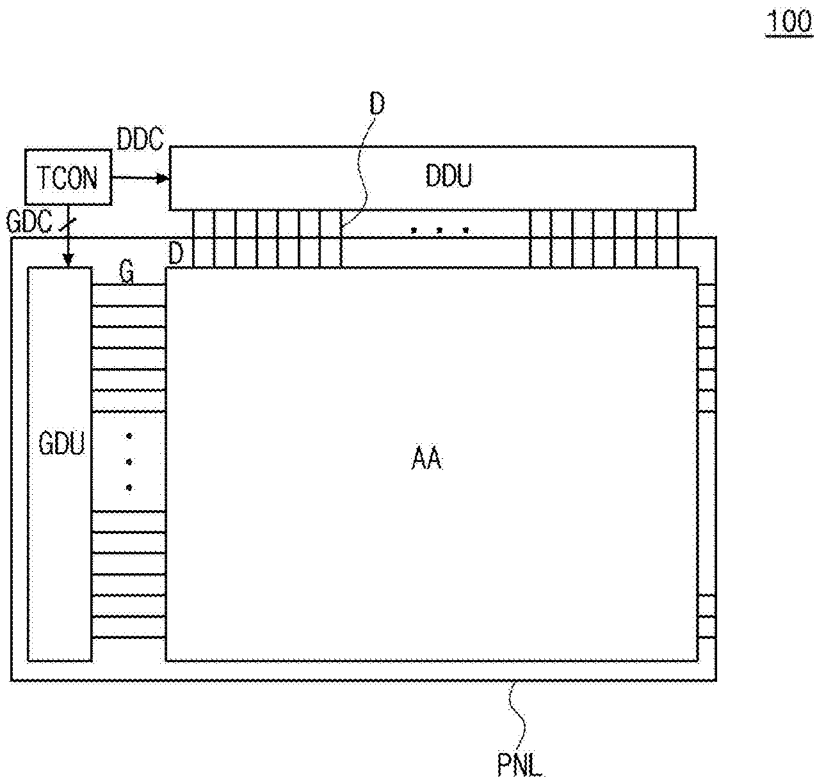
FIG. 1 is a block diagram of a display apparatus according to the present invention.

Advantages and features of the present invention, and a method for achieving them will become apparent with reference to the embodiments described below in detail in conjunction with the accompanying drawings. However, the present invention is not limited to the embodiments disclosed below, but will be implemented in a variety of different forms, and only these embodiments allow the disclosure of the present invention to be complete, and those of ordinary skill in the art to which the present invention pertains. It is provided to inform the person of the scope of the present invention. The present invention is only defined by the scope of the claims.

Since the shapes, sizes, proportions, angles, numbers, etc. disclosed in the drawings for explaining the embodiments of the present invention are exemplary, the present invention is not limited to the matters shown in the drawings. Throughout the specification, like elements may be referred to by like reference numerals. In addition, when describing the present invention, if it is determined that a detailed description of a related known technology may unnecessarily obscure the subject matter of the present invention, the detailed description thereof will be omitted.

When 'including', 'having', 'consisting', etc. mentioned in this specification are used, other parts may be added unless the expression 'only' is used. When a component is expressed in the singular, the plural is included unless specifically stated otherwise.

When interpreting components, it should be interpreted as including a range of errors, even if there is no explicit description.

For example, when the positional relationship of two parts is described as 'on', 'upper', 'lower', 'beside', etc., the expression 'directly' or 'directly' is used Unless otherwise stated, one or more other parts may be positioned between the two parts.

Spatially relative terms "below", "beneath", "lower", "above", "upper", etc. may be used to easily describe the correlation between one element or components and another element or components as shown in the drawings. In addition to the directions shown in the drawings, relative terms should be understood as terms that include different orientations of the element during use or operation. For example, when the element shown in the figure is turned over, the other element described as "beneath" may be placed "above" another element. Accordingly, the exemplary term "beneath" may include both directions above and below. Likewise, the exemplary terms "above" or "on" may include both directions above and below.

In the case of a description of a temporal relationship, for example, 'immediately' or 'directly' when a temporal relationship is described with 'after', 'following', 'after', 'before', etc. It may include cases that are not continuous unless the expression"

Although the first, second, etc. are used to describe various elements, these elements are not limited by these terms. These terms are only used to distinguish one component from another. Accordingly, the first component mentioned below may be the second component within the spirit of the present invention.

The term "at least one" should be understood to include all possible combinations from one or more related items. For example, the meaning of "at least one of the first, second, and third items" means a combination of all items that can be presented from two or more of the first, second and third items, as well as each of the first, second or third items.

Each feature of the various embodiments of the present invention may be partially or wholly combined or combined with each other, technically various interlocking and driving are possible, and each embodiment may be implemented independently of each other or may be implemented together in a related relationship.

When adding reference numerals to components of each drawing describing embodiments of the present invention, the same components may have the same reference numerals as much as possible even though they are indicated in different drawings.

In embodiments of the present invention, the source electrode and the drain electrode are merely distinguished for convenience of description, and the source electrode and the drain electrode may be interchanged. The source electrode may be the drain electrode, and the drain electrode may be the source electrode. In addition, the source electrode of one embodiment may be a drain electrode in another embodiment, and the drain electrode of one embodiment may be a source electrode in another embodiment.

In some embodiments of the present invention, for convenience of description, a source region and a source electrode are distinguished and a drain region and a drain electrode are distinguished, but embodiments of the present invention are not limited thereto. The source region may be a source electrode, and the drain region may be a drain electrode. Also, the source region may be the drain electrode, and the drain region may be the source electrode.

Each of the features of the various embodiments of the present invention may be partially or wholly combined or combined with each other, and may be technically variously interlocked and driven by those skilled in the art, and each embodiment may be implemented independently of each other or together in a related relationship.

Hereinafter, the present invention will be described in detail with reference to the accompanying drawings.

FIG. 1 is view showing a block diagram showing the display apparatus 100 according to the present invention.

As shown in FIG. 1, the display apparatus 100 including a display panel PNL and a driving unit for applying data of an input image to a pixel area AA of the display panel PNL.

The display panel PNL may includes various display panel such as an organic light emitting display panel, a liquid crystal display panel, a quantum dot display panel, a micro-LED display panel, and a min-LED display panel.

The display panel PNL includes a plurality of data lines D, a plurality of gate lines G arranged vertically to the plurality of data lines D, and a pixel area AA having a plurality of pixels in a matrix form which are defined by the plurality of data lines D and gate lines G.

The driving circuit of the display panel PNL includes a data driving circuit DDU for supplying data voltages to the plurality of data lines D, a gate driving circuit GDU for supplying sequentially gate signals synchronized with the data voltages to the plurality of gate lines G, and a timing controlling unit TCON.

At this time, the gate driving circuit GDU is a GIP (Gate In Panel) driving circuit DDU disposed around the pixel area AA of the display panel PNL to supply the gate signal via a plurality of gate lines D.

The timing controlling unit TCON transmits data of the input image received from an external host system to the data driving circuit DDU and the gate driving circuit GDU. The timing controlling unit TCON receives timing signals such as a vertical sync signal, a horizontal sync signal, a data enable signal, and a dot clock which are synchronized with the input image from the external host system.

The timing controlling unit TCON generates various control signals for controlling operation timings of the data driving circuit GDU and the gate driving circuit GDU based on the input timing signal. That is, the timing controlling unit TCON generates a data driving control signal DDC for controlling the data driving circuit DDU and a gate driving control signal GDC for controlling the gate driving circuit GDU.

The timing controlling unit TCON may be disposed in the outside of the display panel PNL. Specifically, the timing controlling unit TCON is disposed on a pad unit such as a printed circuit board. The timing controlling unit TCON transmits the data driving control signal DDC to the data driving circuit DDU and transmits the gate driving control signal GDC to the gate driving circuit GDU from the outside of the display panel PNL.

The data driving circuit DDU receives data of the input image and a data driving control signal DDC from the timing controlling unit TCON. The data driving circuit DDU converts the data of the input image into a gamma compensation voltage by the data driving control signal DDC transmitted from the timing controlling unit TCON to generate a data voltage, and outputs the generated data voltage to a plurality of data lines D.

The data driving circuit DDU includes a plurality of source electrode driver ICs (Integrated Circuits). The source electrode drive IC is connected to the plurality of data lines D by a COG (Chip On Glass) process or a TAB (Tape Automated Bonding) process.

The gate driving circuit GDU includes a GIP driving circuit and a level shifter. The level shifter may be physically separated from the GIP driving circuit. The level shifter may be disposed outside the display panel PNL, for example, on the printed circuit board.

Although the gate driving circuit GDU is disposed in one side of the pixel area AA in the drawing, the gate driving circuit GDU may be disposed in both sides of the pixel area AA.

The voltage level of the gate driving control signal GDC transmitted from the timing controlling TCON is converted by the level shifter and then input to the gate driving circuit GDU. Since the signal input to the level shifter is a digital signal, the thin film transistors of the display panel PNL cannot be driven by this digital signal. Therefore, the level shifter shifts the voltage of each gate driving control signal GDC transmitted from the timing controlling TCON to the signal having the voltage swinging between the gate low voltage VGL and the gate high voltage VGH.

The gate high voltage VGH is set to the voltage higher than the threshold voltage of the transistor formed on the display panel PNL, and the gate low voltage VGL is set to the voltage lower than the threshold voltage of the transistor.

The gate driving circuit GDU may be formed on the substrate of the display panel PNL at the same time as the pixel area AA. That is, in the gate driving circuit GDU, the GIP driving circuit may be formed in the bezel area of the display panel PNL at the same time as the pixel area AA.

Figure 2:
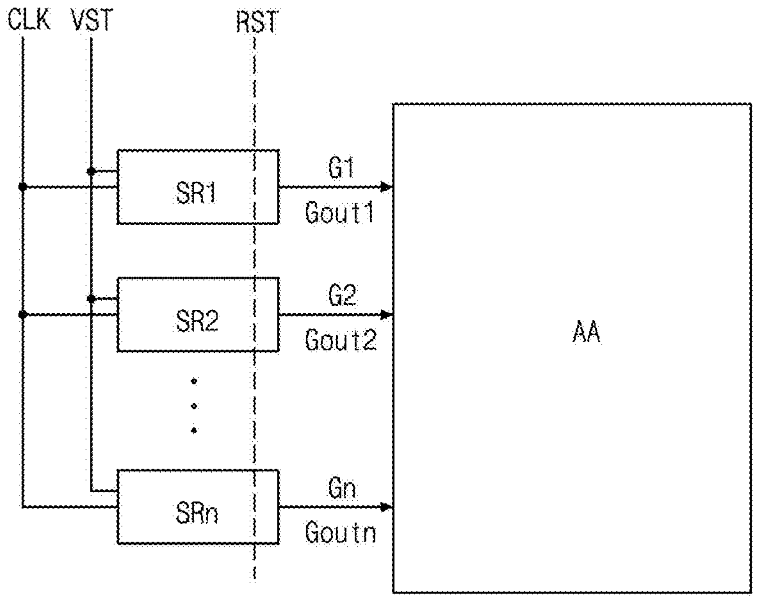
FIG. 2 is the block diagram showing the relationship between a plurality of stages of a data driving circuit including a GIP driving circuit and control signals of the GIP driving circuit according to the present invention.

FIG. 2 is the block diagram showing the relationship between a plurality of stages of the data driving circuit DDU including the GIP driving circuit and the control signal of the GIP driving circuit according to the present invention.

The data driving circuit DDU, that is, the GIP driving circuit includes a plurality of stages ST1 to STn. Each of the stages ST1 to STn outputs first to nth gate pulses Gout1 to Goutn, respectively. The gate pulses Gout1 to Goutn are applied to the gate lines of the display apparatus.

The GIP driving circuit is a shift resistor SR that receives the gate driving control signal GDC and sequentially outputs gate signals to the gate lines G1, G2, . . . Gn. That is, the shift register SR sequentially supplies the gate signal generated by the level shifter to the gate lines G1, G2, . . . Gn by the gate driving control signal GDC.

The gate driving control signal GDC includes a gate start pulse VST and a clock CLK related to a shift of the gate signal.

Each of the shift register SR includes a plurality of stages. The first stage SL1 of the shift register SR starts outputting the gate signal in response to the gate start pulse VST, and shifts and outputs the gate signal in response to the first clock CLK. The gate signals output from each of the stages SL1 to SLn are supplied to the gate lines G1, G2, . . . Gn.

Therefore, when the power of the clock CLK, the start pulse VST, and gate driving circuit is turned on, the reset signal RST for resetting each the shift register SR, the gate high voltage VGH, and the gate low voltage VGL are input each of the shift register SR.

Figure 3:
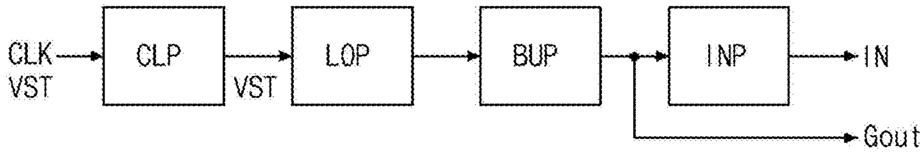
FIG. 3 is a circuit diagram briefly showing the configuration of one stage among the plurality of stages shown in FIG. 2.

FIG. 3 is the circuit diagram briefly illustrating the structure of one stage of the plurality of stages shown in FIG. 2.

As shown in FIG. 3, the stage of the shift register SR generates the gate signal and largely includes a clock part CLP, a logic part LOP, a buffer part BUP, and an inverter part INP.

Although not shown in the figure, the clock part CLP includes a plurality of signal lines to transfer the input clocks and the start signals to the logic part LOP and the buffer part BUP under the control of the timing control unit TCON.

The logic part LOP is composed of a plurality of transistors. The logic part LOP receives the start pulse VST through the clock part CLP, precharges the Q node, and controls the Q node.

The buffer part BUP is composed of the plurality of transistors and outputs the gate signal according to the clock applied to the clock input terminal of the clock unit CLP in response to the node voltage.

The inverter part INP receives the gate pulse Gout and outputs the inverse signal IN. The inverse signal IN is supplied to the previous stage to control the operation of the previous stage. The inverter part INP may include the plurality of transistors.

For example, the inverter part INP may include a pMOS transistor and an nMOS transistor connected in series for each other. These pMOS transistor and nMOS transistor may have separate structures in separate spaces, but in the present invention, the pMOS transistors and nMOS transistors may be formed to overlap in one space. Since the pMOS transistor and the nMOS transistor are arranged in one space, the area of the inverter part INP can be reduced and the circuit structure of the inverter part INP can be simplified.

Figure 4:
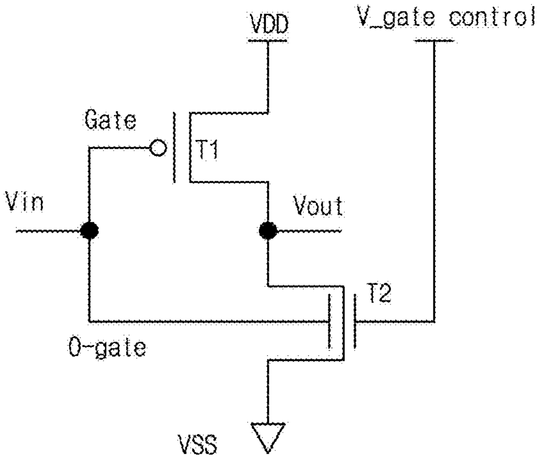
FIG. 4 is the circuit diagram showing the structure of the inverter part according to the present invention.

FIG. 4 is the circuit diagram showing the structure of the inverter part INP according to the present invention.

As shown in FIG. 4, the inverter part INP according to the present invention may include a first transistor T1 and a second transistor T2. The first transistor T1 may be formed of a polycrystalline semiconductor, in particular, a low-temperature polycrystalline semiconductor. The second transistor T2 may be formed of an oxide semiconductor.

The high potential voltage VDD is applied to the drain of the first transistor T1, and the source of the first transistor T1 is connected to the drain of the second transistor T2 to output the output voltage Vout. Further, the input voltage Vin is applied to the gate of the first transistor T1.

The drain of the second transistor T2 is connected to the source of the first transistor T1 to output the output voltage Vout, and the low potential voltage VSS is applied to the source of the second transistor T2. Further, the input voltage Vin and the gate control signal V_gate control are applied to the gate of the second transistor T2.

In the inverter unit having this structure, when the positive (+) voltage, for example, the input voltage Vin of +5V is applied, the second transistor T2 is turned on and the first transistor T1 is turned off. Conversely, when the input voltage Vin of −5V is applied, the second transistor T2 is turned off and the first transistor T1 is turned on to perform the function of an inverter.

The input voltage Vin may be the gate pulse Gout, and the output voltage Vout may be the inverse signal IN. The high potential voltage VDD may be the gate high voltage VGH, and the low potential voltage VSS may be the gate low voltage VGL.

In the conventional inverter part INP, the first transistor formed of the polycrystalline semiconductor and the second transistor formed of the oxide semiconductor are connected in series, but the gate control signal is not applied to the gate electrode of the second transistor.

In the conventional inverter part INP, when the second transistor formed of the oxide semiconductor is turned on for a long time, the positive (+) bias voltage is continuously applied to the second transistor. This electrical stress causes deterioration of the second transistor, so that the threshold voltage of the second transistor is shifted to positive (+) and thus the GIP circuit including the inverter part INP becomes defective.

On the contrary, in the present invention, the gate control signal is applied to the gate electrode of the second transistor to restore the deteriorated second transistor. That is, in the period when the display apparatus is turned off or not driven, the negative (−) control voltage corresponding to the positive (+) bias voltage is applied to the gate electrode of the second transistor to move the shifted threshold voltage to negative (−), as a result the deteriorated characteristics of the second transistor are restored to their original states.

At this time, the control voltage may be −1 to −10V, but is not limited thereto and may be variously set according to the characteristics of the second transistor.

As described above, in the present invention, since the gate control signal corresponding to the bias voltage is applied to the gate of the second transistor made of the oxide semiconductor, it is possible to prevent a characteristic deterioration in which the threshold voltage is shifted due to deterioration of the second transistor by the bias voltage for the long time.

Figure 5:
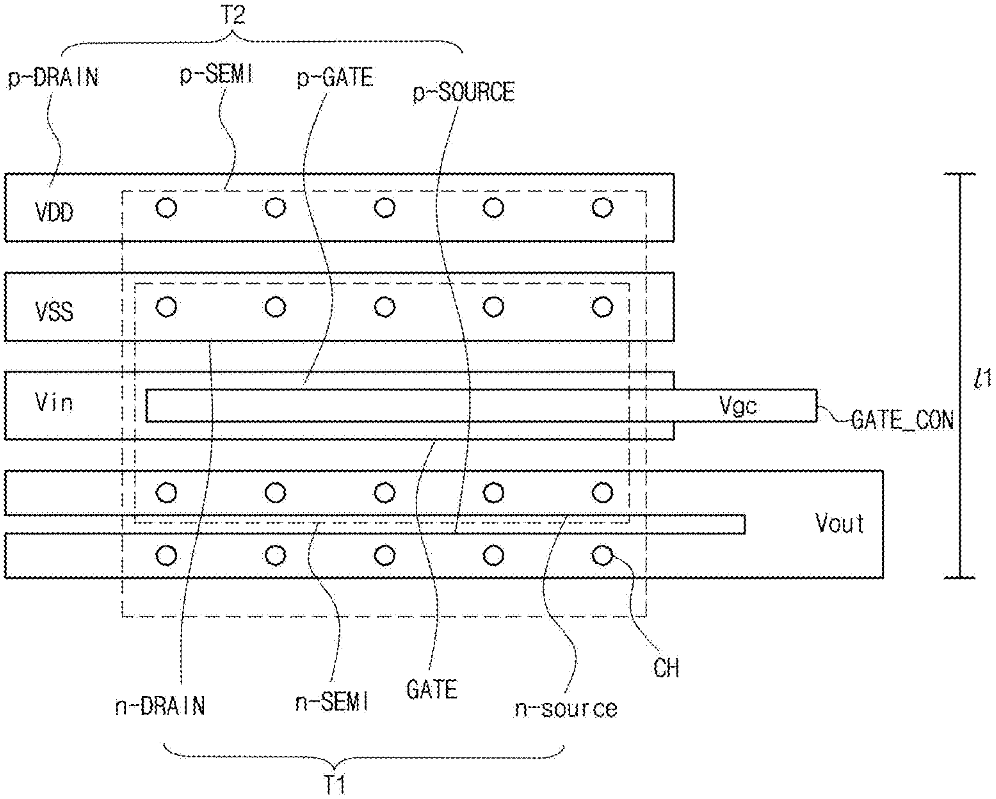
FIG. 5 is a plan view showing the inverter part of the GIP circuit of the display apparatus according to the present invention.

FIG. 5 is the plan view illustrating the inverter part of the GIP circuit of the display apparatus according to the present invention.

As shown in FIG. 5, the first transistor T1 and the second transistor T2 of the inverter part of the GIP circuit according to the present invention are overlapped in the same area.

The first transistor T1 includes a first semiconductor layer p_SEMI formed of the polycrystalline semiconductor, a gate electrode GATE on the first semiconductor layer p-SEMI, a first drain electrode p-DRAIN to which the high potential voltage VDD is applied, and a first source electrode p-SOURCE to output the output voltage Vout.

Further, the second transistor T2 includes a second semiconductor layer n_SEMI formed of the oxide semiconductor, the gate electrode GATE on the second semiconductor layer n-SEMI, a second drain electrode n-DRAIN to which the low potential voltage VSS is applied, and a second source electrode n-SOURCE to output the output voltage Vout.

The first semiconductor layer p-SEMI and the second semiconductor layer n-SEMI are formed to be overlapped. At this time, the second semiconductor layer n-SEMI has the area smaller than that of the first semiconductor layer p-SEMI and disposed on the first semiconductor layer p-SEMI. The first semiconductor layer p-SEMI is formed to completely cover the second semiconductor layer n-SEMI, but is not limited thereto.

The first transistor T1 and the second transistor T2 share the gate electrode GATE. That is, the gate electrode GATE is overlapped with the first semiconductor layer p-SEMI and the second semiconductor layer n-SEMI between the first semiconductor layer p-SEMI and the second semiconductor layer n-SEMI, so that one of the first semiconductor layer p-SEMI and the second semiconductor layer n-SEMI is activated as the voltage is applied to the gate electrode GATE. For example, when the voltage of +5V is applied, the second semiconductor layer n-SEMI is activated and a channel layer is formed therein. When the voltage of ~5V is applied, the first semiconductor layer p-SEMI is activated and the channel layer may be formed therein.

The second drain electrode n-DRAIN of the second transistor T2 is disposed between the first drain electrode p_DRAIN and the gate electrode GATE. The first drain electrode p-DRAIN is ohmic-contacted with the first semiconductor layer p-SEMI through the contact hole CH, and the second drain electrode n-DRAIN is ohmic-contacted with the second semiconductor layer n-SEMI through the contact hole CH.

The first source electrode p-SOURCE and the second source electrode n-SOURCE are separated but electrically connected to each other. Accordingly, when the first transistor T1 or the second transistor T2 is turned on, the output voltage Vout is output through the first source electrodes p-SOURCE or the second source electrodes n-SOURCE. At this time, the first source electrode p-SOURCE is ohmic-contacted with the first semiconductor layer p-SEMI through the contact hole CH, and the second source electrode n-SOURCE is ohmic-contacted with the second semiconductor layer n-SEMI through the contact hole CH.

Meanwhile, the gate control electrode GATE_CON is disposed on the second semiconductor layer n-SEMI. The gate control signal is applied to the gate control electrode GATE_CON. By applying the control voltage having the opposite sign to the bias voltage as the gate control signal, the threshold voltage shifted caused the deterioration of the second transistor formed of the oxide semiconductor is restored to its original state.

As described above, in the present invention, the first transistor T1 and the second transistor T2 are formed to overlap in the same space. In the present invention since the semiconductor layers p-SEMI and n-SEMI of the first and second transistors T1 and T2 are overlapped in the same region and the first and second transistors T1 and T2 share the gate electrode GATE, it is possible to significantly reduce the space in which transistors are formed.

Figure 6:
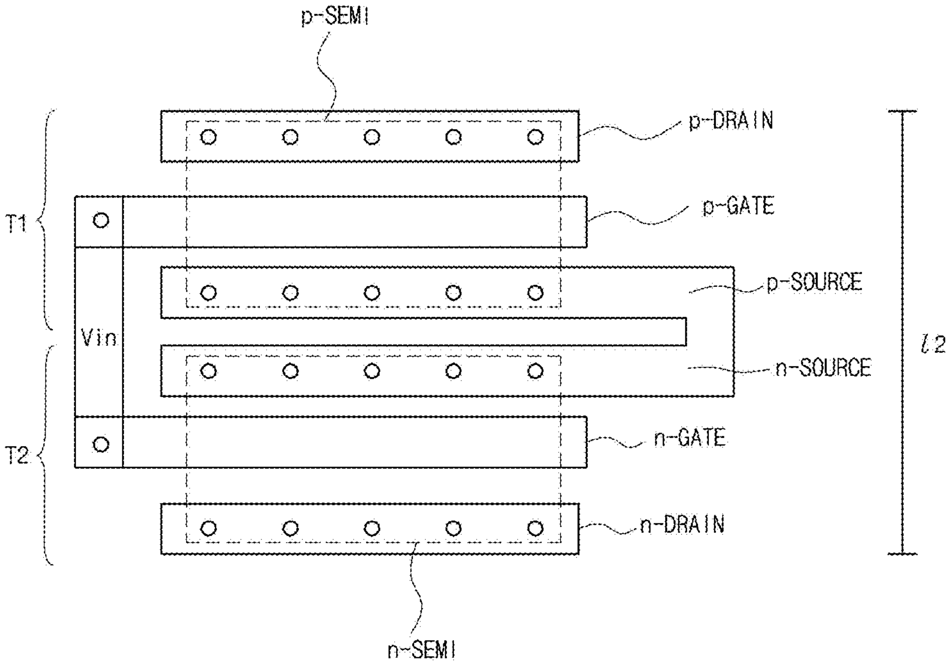
FIG. 6 is a comparative example of the present invention, showing an inverter part in which the first transistor and the second transistor are arranged in separate spaces.

FIG. 6 is the diagram showing the conventional inverter part in which the first transistor T1 and the second transistor T2 are disposed in separate spaces.

As shown in FIG. 6, in this inverter part, the first transistor T1 and the second transistor T2 are disposed in separate spaces. That is, the first transistor T1 is disposed on the upper portion and the second transistor T2 is disposed on the lower portion.

The first transistor T1 includes the first semiconductor layer p-SEMI, the first gate electrode p-GATE, the first source electrode p-SOURCE, and the first drain electrode p-DRAIN. The second transistor T2 includes the second semiconductor layer (n-SEMI), the second gate electrode (n-GATE), the second source electrode (n-SOURCE), and the second drain electrode (n-DRAIN). At this time, the first gate electrode p-GATE and the second gate electrode n-GATE are electrically connected but separated from each other.

In the conventional inverter part, all components of the first transistor T1 and the second transistor T2 are not overlapped or shared, but are separated from each other.

Comparing the inverter part of the present invention shown in FIG. 5 and the conventional inverter part shown in FIG. 6, the semiconductor layers p-SEMI and n-SEMI are overlapped for each other and the first and second transistor T1 and T2 share the gate electrode GATE in the present invention, but the semiconductor layers p-SEMI and n-SEMI are formed at a certain distance apart and the gate electrodes p-GATE and n-GATE are also formed at a certain distance apart in the convention inverter part.

Therefore, the length $\ell$ 1 of the inverter part of the present invention is significantly reduced compared to the length $\ell$ 2 of the conventional inverter part ($\ell 1<\ell 2$) because of the overlap of the semiconductor layers p-SEMI and n-SEMI and the sharing of the gate electrode. For example, while the length $\ell$ 2 of the conventional inverter part is about 260 μm, the length $\ell$ 1 of the inverter unit according to the present invention may be reduced to about 200 μm or less.

Hereinafter, the structure of the inverter part according to the present invention will be described in more detail with reference to the accompanying drawing.

Figure 7:
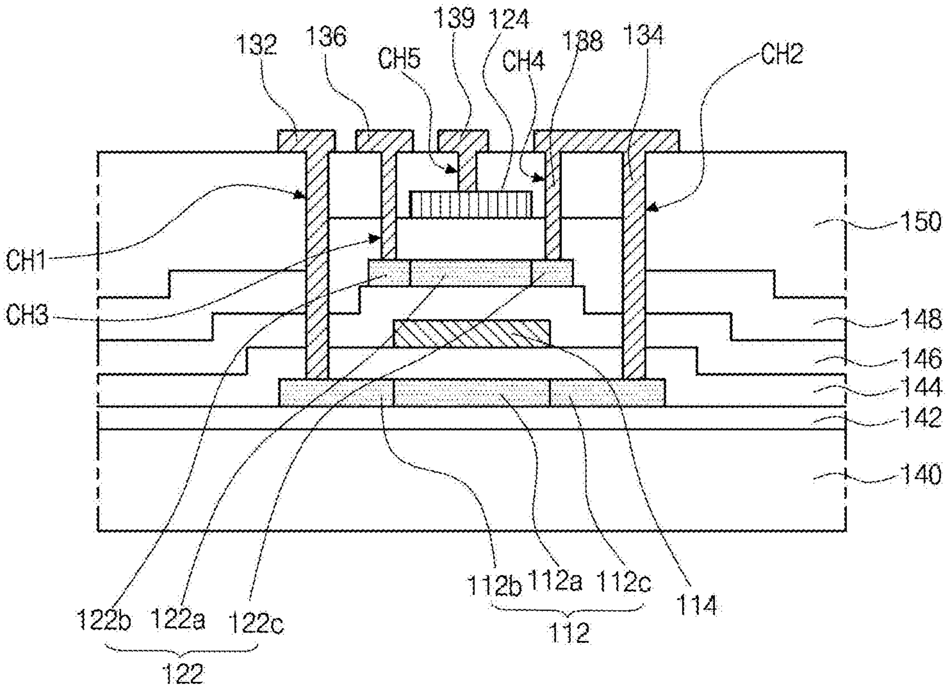
FIG. 7 is a cross-sectional view specifically showing the structure of the inverter part according to the present invention.

FIG. 7 is the view showing the structure of the inverter part according to the present invention.

As shown in FIG. 7, a first buffer layer 142 is formed on a substrate 140. The substrate 140 may be made of a hard material such as a glass or a plastic material, but not limited thereto. For example, the plastic material may include a polyimide, a polymethylmethacrylate, a polyethylene terephthalate, a Polyethersulfone, and a Polycarbonate.

When the substrate 140 is made of polyimide, the substrate 140 may be made of a plurality of polyimide layers, and an inorganic layer may be further disposed between the polyimide layers, but is not limited thereto.

The buffer layer 142 may be formed in the entire area of the substrate 140 to enhance adhering force between the substrate 140 and the layers thereon. Further, the buffer layer 142 may block various types of defects, such as alkali components flowing out from the substrate 140. In addition, the buffer layer 142 may delay diffusion of moisture or oxygen penetrating into the substrate 140.

The buffer layer 142 may be a single layer made of silicon oxide (SiOx) or silicon nitride (SiNx), or multi-layers thereof. When the buffer layer 142 is made of multiple layers, SiOx and SiNx may be alternately formed. The buffer layer 142 may be omitted based on the type and material of the substrate 140, the structure and type of the thin film transistor, and the like.

A first semiconductor layer 112 is formed on the buffer layer 142. The first semiconductor layer 112 may be made of a polycrystalline semiconductor. For example, the polycrystalline semiconductor may be made of low temperature poly silicon (LTPS) having high mobility, but is not limited thereto. The first semiconductor layer 112 includes a channel region 112*a* in a central region and a source region 112*b* and a drain region 112*c* which are doped layers at the both sides of the channel region 112*a*.

A first insulating layer 144 is formed on the first semiconductor layer 112. The first insulating layer 144 may be formed of a single layer or multiple layers made of an inorganic material such as SiOx or SiNx, but is not limited thereto and may be formed the plurality of layers made of the inorganic material and the organic material.

A gate electrode 114 is formed on the first insulating layer 144. The gate electrode 114 may be formed of the single layer or multi layers made of one or alloys of molybdenum (Mo), aluminum (Al), chromium (Cr), gold (Au), titanium (Ti), nickel (Ni), neodymium (Nd), and copper (Cu), but is not limited thereto.

A second insulating layer 146 is formed on the gate electrode 114. The second insulating layer 146 may be formed of the single layer or the multiple layers made of the inorganic material such as SiOx or SiNx, but is not limited thereto and may be formed of a plurality of layers made of the inorganic material and the organic material.

A second semiconductor layer 122 is formed on the second insulating layer 146. The second semiconductor layer 122 may be formed of an oxide semiconductor. For example, the second semiconductor layer 122 may be formed of one of IGZO (Indium-gallium-zinc-oxide), IZO (Indium-zinc-oxide), IGTO (Indium-gallium-tin-oxide), and IGO (Indium-gallium-oxide), but is not limited thereto.

The second semiconductor layer 122 includes the channel region 122*a* in the central region, and the source region 122*b* and the drain region 122*c* which are doped layers at the both sides of the channel region 122*a*.

The gate electrode 114 overlaps the first semiconductor layer 112 with the first insulating layer 144 interposed therebetween and overlaps the second semiconductor layer 122 with the second insulating layer 146 interposed therebetween. At this time, the gate electrode 114 has the same area as the channel region 112*a* of the first semiconductor layer 112 and the channel region 122*a* of the second semiconductor layer 122, so that the gate electrode may be aligned with the channel region 112*a* and the channel region 122*a*.

The gate electrode 114 is electrically connected to the input line (not shown in figure), so that the input voltage is applied to the gate electrode 114. The first semiconductor layer 112 and the second semiconductor layer 122 at the upper and lower portions of the gate electrode 114 are activated by the gate voltage Vin. For example, the second semiconductor layer 122 at the upper portion of the gate electrode 114 is activated when the positive (+) input voltage is applied to the gate electrode 114, and the first semiconductor layer 112 at the lower portion of the gate electrode 114 is activated when the negative (−) input voltage is applied to the gate electrode 114.

A third insulating layer 148 is formed on the second semiconductor layer 122. The third insulating layer 148 may be formed of the single layer or multiple layers made of the inorganic material such as SiOx or SiNx, but is not limited thereto and may be formed the plurality of layers made of the inorganic material and the organic material.

A gate control electrode 124 is formed over the second semiconductor layer 122. The gate control electrode 124 may be formed of the single layer or multi layers made of one or alloys of molybdenum (Mo), aluminum (Al), chromium (Cr), gold (Au), titanium (Ti), nickel (Ni), neodymium (Nd), and copper (Cu), but is not limited thereto.

The gate control signal is applied to the gate control electrode 124. The gate control signal may be the negative (−) voltage corresponding to the positive (+) bias voltage.

A fourth insulating layer 150 is formed on the gate control electrode 124. The fourth insulating layer 150 may be formed of the single layer or multiple layers made of the inorganic material such as SiOx or SiNx, but is not limited thereto and may be formed the plurality of layers made of the inorganic material and the organic material.

A first contact hole CH1 and a second contact hole CH2 are respectively formed in the first insulating layer 144, the second insulating layer 146, the third insulating layer 148, and the fourth insulating layer 150 over the drain region 112*b* and the source region 112*c* of the first semiconductor layer 112. Further, a third contact hole CH3 and a fourth contact hole CH4 are respectively formed in the third insulating layer 148 and the fourth insulating layer 150 over the drain region 122*b* and the source region 122*c* of the second semiconductor layer 122. A fifth contact hole CH5 is formed in the fourth insulating layer over the second gate electrode 124.

The first drain electrode 132, the first source electrode 134, the second drain electrode 136, the second source electrode 138, and the gate control line 139 are formed on the fourth insulating layer 150.

The first drain electrode 132 is ohmic-contacted with the drain region 112*b* of the first semiconductor layer 112 through the first contact hole CH1 and the first source electrode 134 is ohmic-contacted with the source region 112*c* of the first semiconductor layer 112 through the second contact hole CH2.

The second drain electrode 136 is ohmic-contacted with the drain region 122*b* of the second semiconductor layer 122 through the third contact hole CH3 and the second source electrode 138 is ohmic-contacted with the source region 122*c* of the second semiconductor layer 122 through the fourth contact hole CH2. At this time, the source electrode 134 is electrically connected to the second source electrode 138 on the fourth insulating layer 150.

The gate control line 139 is electrically connected to the gate control electrode 124 through the fifth contact hole CH5 to apply the gate control signal from the outside to the gate control electrode 124 through the gate control line 139.

The first drain electrode 132, the second source electrode 134, the second drain electrode 136, the second source electrode 138, and the gate control line 139 may be formed of the single layer or multi layers made of one or alloys of molybdenum (Mo), aluminum (Al), chromium (Cr), gold (Au), titanium (Ti), nickel (Ni), neodymium (Nd), and copper (Cu), but is not limited thereto.

As described above, the inverter part of the GIP circuit according to the present invention includes the pMOS transistor made of the low-temperature polycrystalline semiconductor and the nMOS transistor made of the oxide semiconductor, and the two transistors are formed in a vertically stacked structure in the same area.

In this case, the MOS transistor made of the low-temperature polycrystalline semiconductor is disposed at the lower portion and the nMOS transistor made of the oxide semiconductor is disposed at the upper portion for the following reasons.

The low-temperature polycrystalline semiconductor is formed at lower temperature than the polycrystalline semiconductor, but is formed at relatively high temperatures compared to the oxide semiconductor Therefore, if the nMOS transistor made of the oxide semiconductor is disposed at the upper portion and the pMOS transistor made of the low-temperature polycrystalline semiconductor is disposed at the lower portion, the oxide semiconductor layer at the lower portion is affected by the high-temperature process of polycrystalline semiconductor, which is the subsequent process, and thus the nMOS transistor becomes defective.

On the other hand, in the present invention, since the pMOS transistor formed of the low-temperature polycrystalline semiconductor is disposed at the lower portion and the nMOS transistor formed of the oxide semiconductor is disposed at the upper portion, the polycrystalline semiconductor layer disposed at the lower portion is not affected by the low-temperature process of the oxide semiconductor, which is the subsequent process, and thus the defect of the nMOS transistor can be prevented.

Additionally, in the present invention, by forming nMOS and pMOS in the vertically stacked structure in the same space, the space of the inverter part can be significantly reduced, thereby reducing the area of the bezel area.

It will be apparent to those skilled in the art that various modifications and variations can be made in the gate in panel driving circuit and the display apparatus having the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A gate in panel (GIP) circuit, comprising:
- a substrate;
- a first semiconductor layer on the substrate;
- a gate electrode over the first semiconductor layer;
- a second semiconductor layer over the gate electrode;
- a gate control electrode over the second semiconductor layer;
- an insulating layer over the gate control electrode; and
- a first drain electrode, a second drain electrode, a first source electrode, and a second source electrode over the insulating layer,
- wherein the first semiconductor layer and the second semiconductor layer overlap each other with the gate electrode therebetween,
- wherein the gate electrode and the gate control electrode overlap each other with the second semiconductor layer therebetween,
- wherein the first semiconductor layer is made of a polycrystalline material, and the second semiconductor layer is made of an oxide semiconductor material,
- wherein a first voltage is applied to the gate electrode and a second voltage is applied to the gate control electrode in a turn-off period, and
- wherein the first voltage and second voltage are voltages of opposite polarity from each other.

2. The GIP circuit of claim 1, wherein the first semiconductor layer is formed of a polycrystalline semiconductor.

3. The GIP circuit of claim 1, wherein the second semiconductor layer is formed of an oxide semiconductor.

4. The GIP circuit of claim 1, wherein the first drain electrode is contacted with a drain region of the first semiconductor layer and the first source electrode is contacted with a source region of the first semiconductor layer.

5. The GIP circuit of claim 1, wherein the first source electrode is contacted with a source region of the first semiconductor layer and the second source electrode is contacted with a source region of the second semiconductor layer.

6. The GIP circuit of claim 1, wherein the first source electrode and the second source electrode are electrically connected to each other over the insulating layer.

7. The GIP circuit of claim 1, further comprising a gate control line over the insulating layer to supply the gate control signal to the gate control electrode.

8. The GIP circuit of claim 7, wherein the gate control signal has a voltage of opposite sign to a bias voltage applied to the second semiconductor layer.

9. A display apparatus, comprising:

a display panel and a driving unit outside the display panel; and a gate in panel circuit of claim 1 in the driving unit.

10. The display apparatus of claim 9, wherein the display panel includes an organic light emitting display panel, a liquid crystal display panel, a quantum dot display panel, a micro-LED display panel, or a mini-display panel.

* * * * *